United States Patent [19]
Greene

[11] 4,312,035
[45] Jan. 19, 1982

[54] APPARATUS FOR CONTROLLING ELECTRICAL POWER IN A DATA PROCESSING SYSTEM

[76] Inventor: Richard E. Greene, Sasqua Hills Rd., East Norwalk, Conn. 06855

[21] Appl. No.: 49,321

[22] Filed: Jun. 18, 1979

[51] Int. Cl.$^3$ .......................... G06F 15/16; H04Q 3/00
[52] U.S. Cl. .................................. 364/200; 340/825.22
[58] Field of Search ................ 364/200 MS File, 483, 364/492, 569, 900 MS File; 340/147 P, 150, 151, 152 R, 292, 309.1, 309.5, 163; 179/2 AM, 7.1 R, 175.2 C; 235/92 PD, 92 T

[56] References Cited

U.S. PATENT DOCUMENTS

| | | | |
|---|---|---|---|
| 2,171,751 | 9/1939 | Jackel | 340/292 X |
| 2,619,529 | 11/1952 | Barker | 340/292 X |
| 3,631,452 | 12/1971 | Richard | 340/309.1 X |
| 3,641,570 | 2/1972 | Thompson | 340/292 X |
| 3,988,727 | 10/1976 | Scott | 340/309.1 |
| 4,024,411 | 5/1977 | Bengoa | 340/309.1 X |
| 4,041,281 | 8/1977 | Gaudeul | 235/92 PD |

*Primary Examiner*—Raulfe B. Zache
*Attorney, Agent, or Firm*—Hubbell, Cohen, Stiefel & Gross

[57] ABSTRACT

An apparatus for controlling electrical power in a data processing system having one or more central processor units and a plurality of peripheral units, including circuitry for selectively connecting a voltage signal to each peripheral unit to cause power to be supplied thereto, and metering means for measuring the amount of time the voltage signal is provided to each separate peripheral whereby the supply of power to any one of the peripheral units may be centrally controlled and monitored. Also included is a circuit for sequentially connecting the voltage signal to the peripheral units.

12 Claims, 3 Drawing Figures

APPARATUS FOR CONTROLLING ELECTRICAL POWER IN A DATA PROCESSING SYSTEM

BACKGROUND OF THE INVENTION

Field of the Invention

The present invention relates to apparatus for controlling electrical power, and particularly to such apparatus for controlling electrical power in a data processing system.

SUMMARY OF THE INVENTION

An electrical power control apparatus for a data processing system having one or more central processor units and a plurality of peripheral units includes means for selectively connecting a voltage signal to the peripheral units to cause power to be supplied thereto and metering means, activated by connection of the voltage signal to a peripheral unit, for measuring the amount of time that the selectively connected peripheral unit is supplied with the voltage signal, whereby the supply of power to any one of the plurality of peripheral units may be centrally controlled and monitored. In one form, the invention includes circuit means for sequentially connecting the voltage signal to the peripheral units.

DETAILED DESCRIPTION OF PREFERRED EMBODIMENTS

Figure 1:
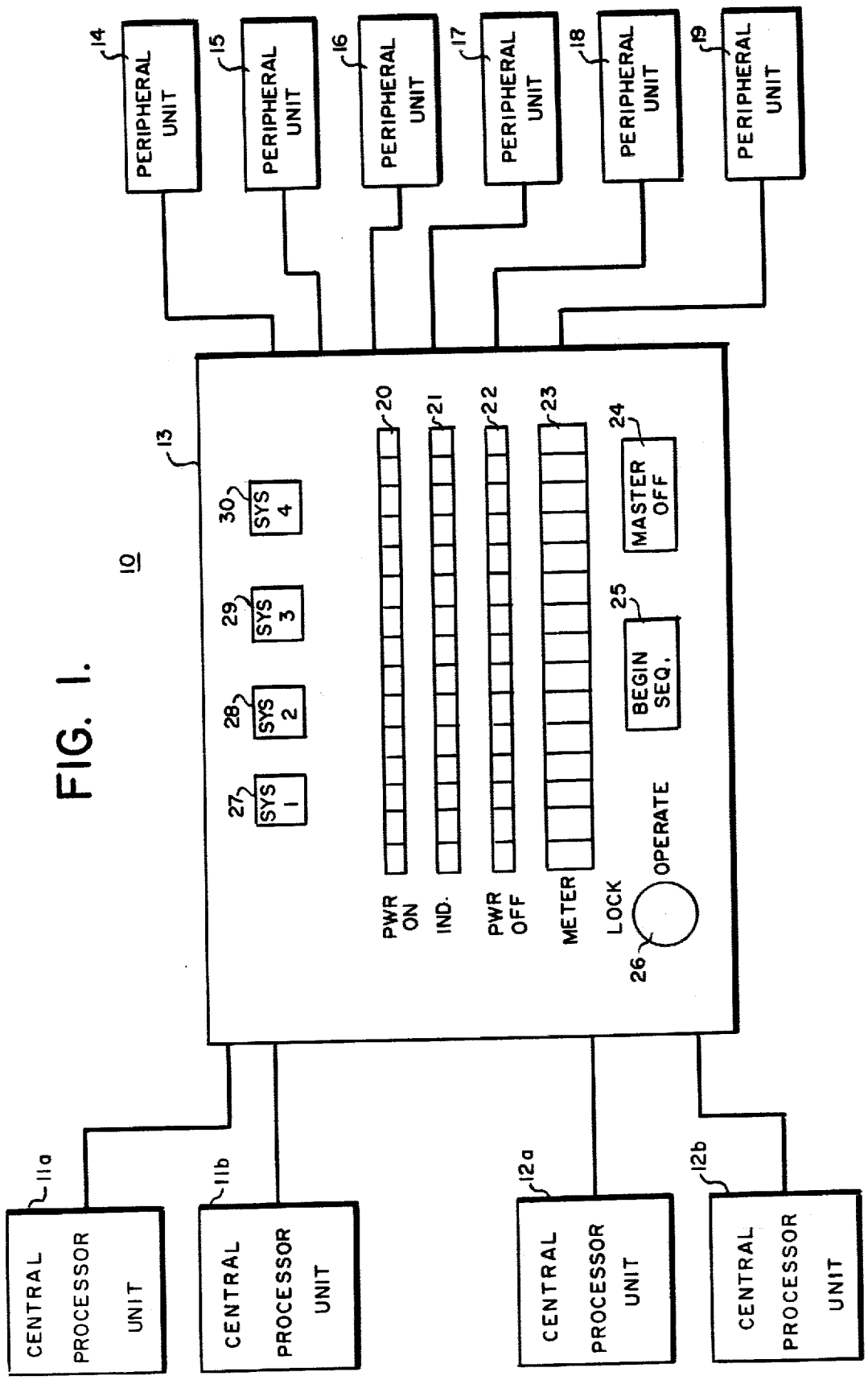
FIG. 1 is a block diagram of a data processing system including the apparatus of the present invention.

FIG. 1 shows a data processing system 10 including central processor units 11 and 12, the control apparatus 13 of the present invention and peripheral units 14–19. More specifically, the control apparatus 13 is shown having one possible configuration of the panel face 13a, including power on switches 20, peripheral unit indicators 21, power off switches 22, meters 23, master off switch 24, begin sequence switch 25, key lock 26, and system indicators 27–30. Each of the power on switches 20, indicators 21, power off switches 22, and meters 23 are intended to correspond to a separate peripheral unit which may be connected to the control apparatus 13. In the system shown, six peripheral units are connected to a control apparatus capable of handling 15 separate outputs. A control apparatus according to the present invention may be designed to be capable of handling more or less than the number of units shown. In addition, the number of central processor units used may also be varied. The operation of the control apparatus 13 via the switches, indicators and meters shown on the panel 13a will be described with respect to FIG. 2.

Figure 2A:
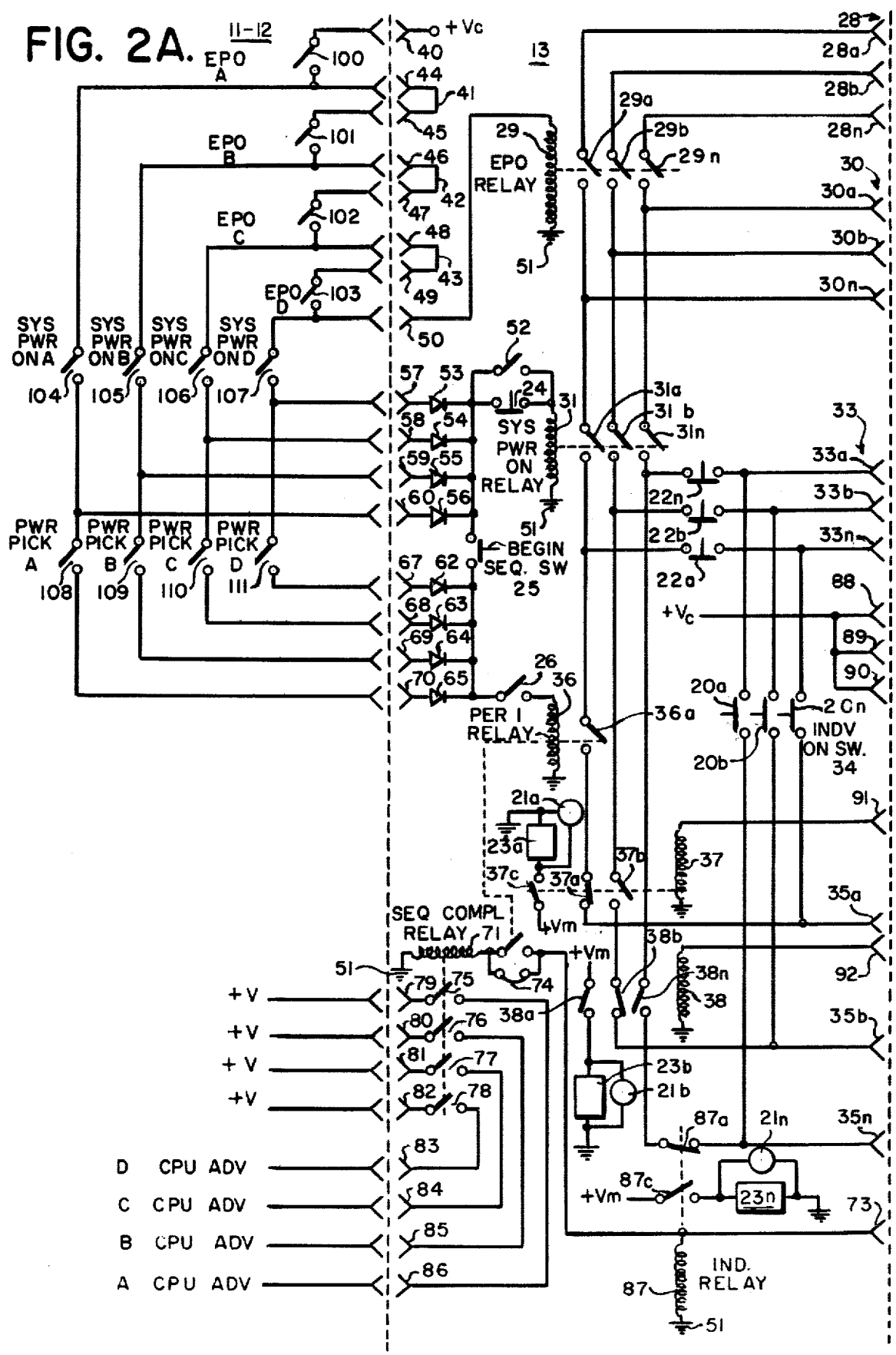
FIGS. 2A and 2B are circuit diagrams of the apparatus of the present invention in combination with a functionally represented data processing system.
Figure 2B:
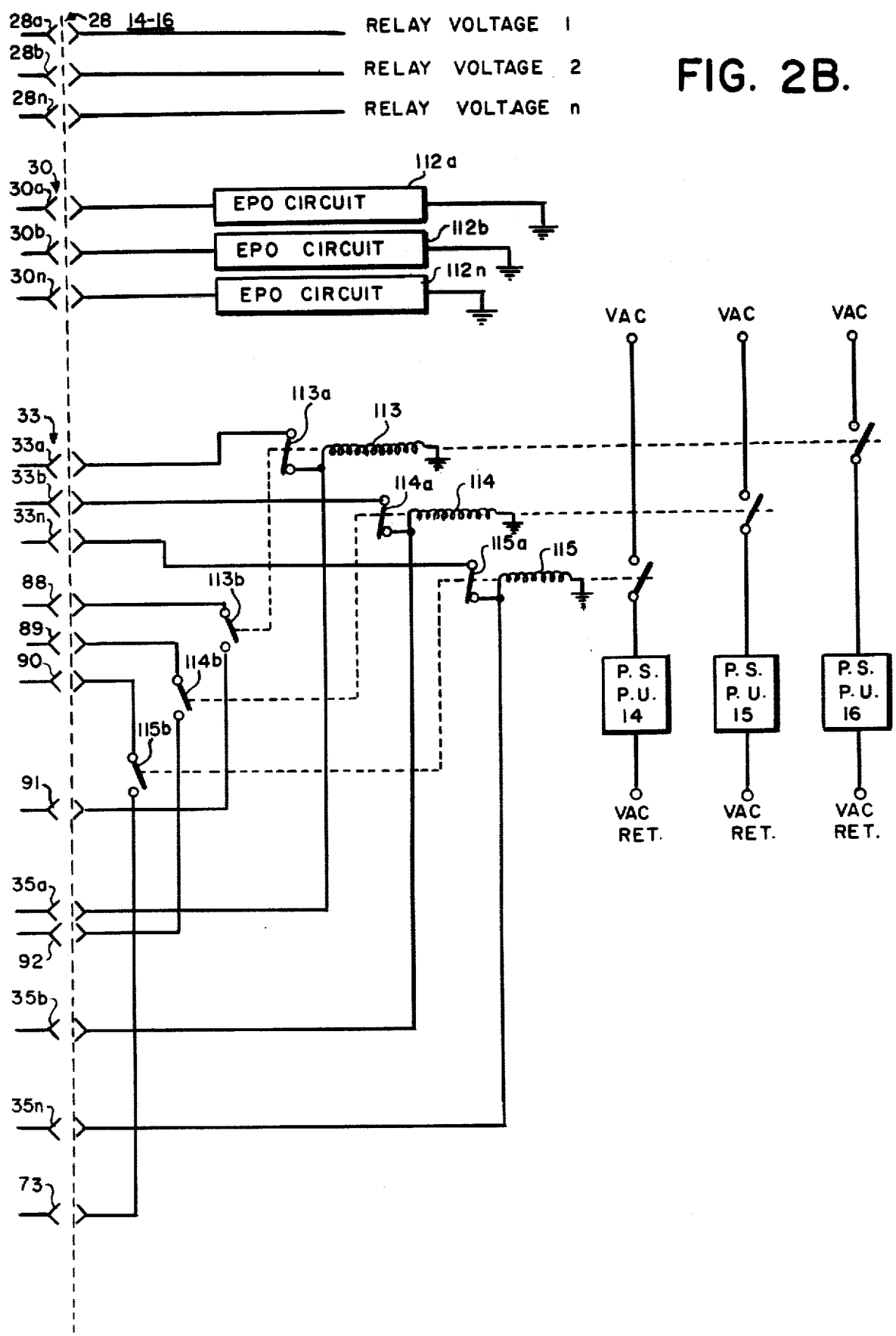

FIGS. 2A and 2B are schematic diagrams depicting part of the circuitry of the data processing system shown in FIG. 1. Included are central processor units 11a, 11b, 12a and 12b designated 11–12, control apparatus 13, and peripheral units 14–16. The circuitry of the four central processor units is shown as one at 11–12 and appears in functional form. The actual hardware used will vary with each application.

The control apparatus of the present invention includes a connector 28, having terminals 28a–28n, representing any desired number of terminals. Terminals 28a–28n are connected to one contact each of separate pairs of contacts 29a–29n of the emergency power off relay 29. The contacts 29a–29n are normally open and close upon activation of the relay 29. The other contacts of pairs of contacts 29a–29n are connected back to the peripheral units 14–16 via a connector 30 having terminals 30a–30n. The other contacts of pairs of contacts 29a–29n are also connected to one contact of separate pairs of contacts 31a–31n of the system power on relay 31. Pairs of contacts 31a–31n are normally open and close upon activation of the relay 31. The other contacts of pairs of contacts 31a–31n are connected to one side of power off switches 22a–22n, respectively. The switches 22a–22n are normally closed and open upon activation thereof. The other sides of switches 22a–22n are connected to the individual peripheral units through connector 33, terminals 33a–33n. The other sides of switches 22a–22n are also connected to one side of power on switches 20a–20n, respectively. The contacts of switches 20a–20n are normally open and close upon individual activation thereof. The other contacts of pairs of contacts 31a–31n are also connected, through various sets of relay contacts, to the peripheral units via connectors 35a–35n. The other contact of pair of contacts 31a is connected through pairs of contacts 36a and 37a to the terminal 35a. Contacts 36a are normally open and close upon the activation of relay 36. Contacts 37a are normally closed and open upon activation of the relay 37. The other contact of pair of contacts 31b is connected through pairs of contacts 37b and 38b to the terminal 35b. Contacts 37b are normally open and close upon activation of the relay 37. The pair of contacts 38b are normally closed and open upon activation of the relay 38. The other contact of the pair of contacts 31n is connected through pairs of contacts 38n and 87a to the terminal 35n. Contacts 38n are normally open and close upon activation of the relay 38. Contacts 87a are normally closed and open upon activation of the relay 87. The other side of switches 20a–20n are also connected to the connectors 35a–35n, respectively.

The voltage +Vc is connected to the central processor units 11–12 by the connector 40. Jumpers 41, 42 and 43 are also connected to the central processor units 11–12 through connectors 44–49. One end of the coil of emergency power off relay 29 is connected to the central processor units 11–12 by a connector 50. The other end of the coil of the power off relay 29 is connected to ground 51. One end of the coil of the system power on relay 21 is connected to ground 51 and the other end is connected to one side of master off switch 24 and one of switch contacts 52. The other side of master off switch 24 is connected to the other of switch contacts 52 which are closed by the key switch 26.

Diodes 53–56 are connected at their cathodes to the other side of master off switch 24. The anodes of diodes 53–56 are connected to the connectors 57–60. A normally open begin sequence switch 25 is also connected to the other side of master off switch 24. The other side of switch 25 is connected to the cathodes of diodes 62–65 and one side of key switch 26. The other side of key switch 26 is connected to one end of the coil of relay 36. The other end of the coil of relay 36 is connected to ground 51. The anodes of diodes 62–65 are connected to the central processor unit 11 through the terminals 67–70. The coil of the sequence complete relay 71 is connected between ground 51 and a pair of contacts 72 activated by the relay 36. The other contact of the pair of contacts 72 is connected to a connector 73 and therethrough to the peripheral unit 16. A jumper 74 may be optionally connected across the contacts 72. Pairs of contacts 75-78, respectively connect connectors 79-82 from the central processor units 11-12 back to connectors 83-86 of the central processor units 11-12. The coil of a relay 87 is connected between ground 51 and the connector 73.

The voltage +Vc is connected through connectors 88-90 to the peripheral units 14-16. The coils of relays 37 and 38 are connected between ground 51 and connectors 91 and 92.

The relays 37, 38 and 87 have pairs of contacts 37c, 38c and 87c, respectively. A voltage source +Vm is connected to one contact of each of the pairs of contacts 37c, 38c and 87c. The other contacts of pairs of contacts 37c, 38c and 87c are connected to metering means 23a-23n. A second terminal on each of the metering means 23a-23n is connected to ground. The metering means 23a-23n measure the amount of time the voltage signal +Vm is connected thereto and thus the amount of time that power is connected to the respective peripheral unit. In addition, indicators 21a-21n are connected in parallel across the metering means 23a-23n, respectively. The indicators 21a-21n are lighted by activation of the respective relays 37, 38 and 87 and indicate which peripheral units are turned on.

The circuitry of the central processor units 11-12 is shown in functional form in FIG. 2A. The actual circuitry will vary according to the specific equipment used. The central processor units 11-12 have pairs of switch or relay contacts 100-103 which are connected through the terminals 40, and 44-50 to the control apparatus 13. Switches 104-107, represented as pairs of contacts, are each connected to a different one of the pairs of contacts 100-103. Switches 104-107 represent the system power on function performed by the central processor units 11-12. The other side of the switches 104-107 are connected through terminals 57-60 to the anodes of diodes 53-56 in the control apparatus 13. The other side of the switches 104-107 are also connected to one side of switches 108-111, representing the power pick function which originates in the central processor units 11-12. The other sides of the switches 108-111 are connected, respectively, through terminals 67-70 to the anodes of diodes 62-65 in the control apparatus 13.

Voltages +V are provided from the central processor units 11-12 through the connectors 79-82 to the pairs of contacts 75-78 of the relays 71 and back through connectors 83-86, to the central processor units 11-12. Activation of the relay 71 indicates to the central processor units 11-12 that the turn on sequence has been completed.

The peripheral units shown with the control apparatus of the present invention provide the functions indicated by the circuitry of FIG. 2B. In FIG. 2B, the circuitry of three peripheral units 14-16 is functionally represented in integrated form. In practice each separate peripheral unit would contain each one of the different functions depicted. Relay voltages 1-n are provided from the peripheral units through the connectors 28a-28n. Emergency power off circuits 112a-112n are connected to the connector terminals 30a-30n, respectively. Each peripheral unit is provided with a power on relay 113-115. One end of the coil for each relay 113-115 is connected to ground and the other ends are connected to one contact of pairs of normally open contacts 113a-115a, respectively. The other contacts of pairs of contacts 113a-115 are connected to the connector terminals 33a-33n. The other ends of the coils for the relays 113-115 are also connected to the connectors 35a-35n, respectively. Each of the relays 113-115 has an additional pair of normally open contacts 113b-115b, respectively. One contact from each of the pairs of contacts 113b-115n is connected to the connectors 88-90, respectively. The other contacts of pairs of contacts 113b-115b are connected through the connectors 91, 92 and 73, respectively, to the relays 37, 38 and 87. Pairs of contacts 113a-115a are normally open and close upon activation of the relays 113-115, respectively.

Each of the relays 113-115 also has a pair of contacts 113c-115c, respectively, for connecting power from the respective power supply to each peripheral unit. Alternating current power sources VAC are connected to one contact of each of pairs of contacts 113c-115c. The remaining contacts are connected to the respective power supply sections 116-118 of the individual peripheral units. The power supplies are in turn connected to the returns 119-121 for the VAC power sources.

The apparatus of the present invention controls the electrical power of peripheral units in a data processing system in the following manner. Absent an emergency power off signal from any of the central processor units the +Vc voltage at connector 40 is connected through contacts 100-103 to activate the emergency power off relay 29 and close the contacts 29a-29n. If an emergency power off signal originates in one of the central processor units, a pair of contacts, such as the contacts 100-103, would open causing the deactivation of the emergency power off relay 29 and the opening of the contacts 29a-29n. Relay voltages 1-n are supplied from the peripheral units 14-16 through the connector 28 to the contacts 29a-29n. The relay voltages 1-n are supplied through the connector 30 to the emergency power off circuits 112a-112n in the individual peripheral units. When the voltage signal to these circuits is interrupted, as when an emergency power off signal originates in a central processor unit, the power in each of the peripheral units is turned off.

The relay voltages 1-n are also supplied to the contacts 31a-31n of the system power on relay 31. Closure of a switch 104-107 represents a system power on signal from a central processor unit and causes the system power on relay 31 to be activated by the +Vc voltage. Through activation of the relay 31 the relay contacts 31a-31n are closed and the relay voltages 1-n are supplied through the normally closed power off switches 22a-22n and the connector 33 to the contacts 113a-115a of the relays 113-115, respectively, in the individual peripheral units. The relay voltages 1-n are also supplied to the contacts of relays 37 and 38.

Closure of any one of the switches 108-111 represents a power pick signal from one of the central processor units and causes the +Vc voltage to be connected through the diodes 62-65 to one side of the key switch 26. In addition, the begin sequence switch 25 is connected between the cathodes of diodes 53-56 and the one side of the key switch 26. The key switch 26 is connected to one end of the coil 36 and prevents activation of that coil unless a key is used to close the switch. With the key switch 26 closed the closure of one of the switches 108-111 or the begin sequence switch 25 activates the relay 36 which begins the power on sequence for energizing the relays 113-115 in the individual peripheral units. Activation of the relay 36 closes the contacts 36a causing the relay voltage 1 to be supplied through normally closed contacts 37a and the connector 35a to one end of the coil 113. As a result, relay 113 is triggered and the contacts 113a thereof close connecting the relay voltage 1 therethrough to the coil 113. Thus, even if the voltage from the connector 35a is interrupted, the relay 113 remains energized or held through the relay contacts 113a. Activation of the relay 113 also closes contacts 113b causing the +Vc voltage from connector 88 to be supplied through the connector 91 to the relay 37. Activation of the relay 37 opens the contacts 37a, thus removing the original triggering signal from the relay 113, and closes contacts 37b. Closure of contacts 37b causes the relay voltage 2 to be supplied through the normally closed contacts 38b and the connector 35b to trigger the relay 114. Activation of the relay 114 closes the contacts 114a and 114b. Contacts 114a thus supply the relay voltage 2 to the relay 114 and hold that relay in the activated condition. The key switch 26 also closes the contacts 52 to prevent deactivation by the Master Off Switch 24 during the power on sequence.

In addition to the power on sequence described above, the relays 113–115 may also be individually activated or deactivated by the operator. After all of the relays are activated, the operator may deactivate any individual relay by opening the normally closed switches 22a–22n. This interrupts the holding voltage for the relays 113–115, respectively, causing the deactivation thereof. The operator may also deactivate all of the peripheral units at once by pressing the master off switch 24. This opens the normally closed contacts of the switch 24, interrupting the voltage across the coil of relay 31 and opening the contacts 31a–31n. This interrupts the holding voltages of all of the relays 113–115 causing them to deactivate. In addition, once the relay voltages 1–n have been supplied through the relays 29 and 31, the operator may individually activate any one of the relays 113–115 by pressing one of the power off switches 23a–23n. This causes the relay voltage 1–n to be supplied to their respective relays 113–115. As with the sequential activation of the relays 113–115, any individual activation will cause the activation of the respective relay 37, 38 or 87 thereby causing the voltage +Vm to be supplied to a respective metering means for measuring the amount of time during which power is supplied to the respective peripheral unit.

The control apparatus 13 of the present invention offers the operator of a data processing system several benefits. It enables individual, centralized control of the power functions of all of the remote peripheral units. It offers a centralized indication of the power status of each of the remote units. With these control and indication functions, a malfunction in the power up sequence can be easily detected and corrected. The control apparatus 13 also enables usage measurement and time usage balancing of a plurality of peripheral units.

While the present invention has been described above in relation to the appended drawings, it will be obvious to one of ordinary skill in the art that various changes and modifications may be made therein without departing from the true scope of the invention.

What is claimed is:

1. In a data processing system having one or more central processor units and a plurality of peripheral units selectively connectable thereto, an electrical power control apparatus connected between said central processor units and said peripheral units, said power control apparatus comprising:
   means selectively connectable to said peripheral units for selectively connecting a voltage power signal to said peripheral units to cause power to be selectively supplied thereto said means for selectively connecting said voltage power signal to said peripheral units comprising relay means for sequentially connecting said voltage power signal to said peripheral units;
   metering means connected to said relay means and activated by connection of said voltage power signal to any one of said peripheral units through said relay means for measuring the amount of time that the selectively connected peripheral unit is supplied with said voltage power signal, said metering means comprising means connected to each of said peripheral units through said relay means for being separately actuated thereby for separately measuring said amount of connection time of each of said peripheral units, and
   indicator means connected to said metering means and said relay means for indicating which of said peripheral units has been turned on by closure of said relay means, whereby said power control apparatus provides centralized power function control and status indication for said peripheral units.

2. Apparatus according to claim 1, wherein said relay means includes disabling means for preventing connection of said voltage signal to any of said peripheral units in response to any one of a plurality of emergency power off signals.

3. Apparatus according to claim 1, further comprising means connected to said relay means and responsive to the connection of said voltage signal to the sequentially last peripheral unit for generating a second signal indicating the completion of the sequential connection of said voltage signal.

4. Apparatus according to claim 1, wherein said relay means includes activation means responsive to the connection of said voltage signal to one of said peripheral units to cause the connection of said voltage signal to the next sequential peripheral unit.

5. Apparatus according to claim 1, wherein said relay means includes second disabling means for preventing the connection of said voltage signal to one of said peripheral units until said voltage signal is connected to the preceding sequential peripheral unit.

6. Apparatus according to claim 1, including manually operable switch means connected to said relay means for triggering the sequential connection of said voltage signal.

7. Apparatus according to claim 1, including second manually operable switch means connected to said relay means for individually disconnecting said voltage signal from any one of said peripheral units after the completion of the sequential connection of said voltage signal.

8. Apparatus according to claim 1, wherein said relay means includes a first plurality of relays, each having a pair of normally open contacts adapted to directly connect said voltage signal to a separate one of said peripheral units upon activation of the respective relay.

9. Apparatus according to claim 8, wherein said relay means includes a second plurality of relays, each being connected to be activated by the activation of a separate one of first said plurality of relays.

10. Apparatus according to claim 9, wherein the activation of one of said second plurality of relays causes the activation of the one of said first plurality of relays corresponding to the next sequential peripheral unit to have said voltage signal connected thereto.

11. Apparatus according to claim 9 wherein said metering means is connected to a separate pair of contacts which may be activated by a different one of said second plurality of relays.

12. Apparatus according to claim 9, wherein said relay means includes separate triggering means for activating each of said first plurality of relays and separate holding means for maintaining the activation of each of said first plurality of relays after the activation thereof by the respective triggering means.

* * * * *